United States Patent
Ho

(10) Patent No.: US 6,704,677 B2
(45) Date of Patent: Mar. 9, 2004

(54) METHOD AND APPARATUS FOR GENERATING A DATA PATTERN FOR SIMULTANEOUSLY TESTING MULTIPLE BUS WIDTHS

(75) Inventor: Stephen Ho, Fremont, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 202 days.

(21) Appl. No.: 10/016,842

(22) Filed: Dec. 14, 2001

(65) Prior Publication Data

US 2003/0115009 A1 Jun. 19, 2003

(51) Int. Cl.[7] ............................. G06F 11/00; G11C 29/00
(52) U.S. Cl. ..................... 702/119; 714/720; 714/738
(58) Field of Search ........................ 708/530; 714/56, 714/43, 32, 738, 720; 702/119, 120

(56) References Cited

U.S. PATENT DOCUMENTS

| | | | | |
|---|---|---|---|---|
| 4,459,694 A | * | 7/1984 | Ueno et al. ................. | 714/720 |
| 5,457,696 A | * | 10/1995 | Mori ........................... | 714/720 |
| 5,475,815 A | * | 12/1995 | Byers et al. ................... | 714/32 |
| 6,317,851 B1 | * | 11/2001 | Kobayashi ................... | 714/720 |
| 6,609,221 B1 | * | 8/2003 | Coyle et al. ................. | 714/715 |

* cited by examiner

Primary Examiner—Marc S. Hoff
Assistant Examiner—Paul Kim
(74) Attorney, Agent, or Firm—Park, Vaughn & Fleming LLP; Edward J. Grundler

(57) ABSTRACT

One embodiment of the present invention provides a system that facilitates generating a bus testing data pattern for simultaneously testing multiple bus widths. The system first receives a list of bus widths to be tested. Next, the system receives a root test pattern with a width equal to the width of the smallest bus in the list. The system then inverts each bit of the root test pattern and concatenates this inverted pattern with the original pattern. Next, the system creates an additional pattern by repeating the second pattern sufficient times so that the width of this additional test pattern equals the width of the next larger bus. The system then creates a test pattern for the next larger bus by inverting each bit of the additional test pattern and concatenating this inverted test pattern with the additional test pattern.

21 Claims, 7 Drawing Sheets

64-BIT BUS
TRANSITIONS 310

4-BIT BUS
TRANSITIONS 312

0XFFFFFFFF, FFFFFFFF
0X00000000, 00000000
0XFFFFFFFF, FFFFFFFF
0X00000000, 00000000

TEST PATTERN 314

64-BIT BUS
TRANSITIONS 410

4-BIT BUS
TRANSITIONS 412

```
0X0F0F0F0F,0F0F0F0F
0XF0F0F0F0,F0F0F0F0
0X0F0F0F0F,0F0F0F0F
0XF0F0F0F0,F0F0F0F0
```

TEST PATTERN 414

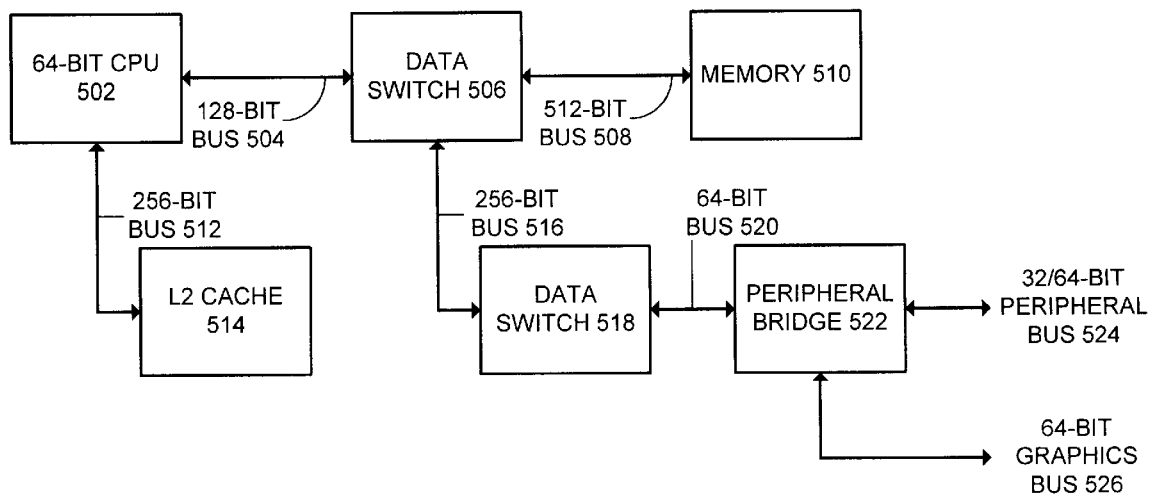
FIG. 5A
```
0X00000000,FFFFFFFF,FFFFFFFF,00000000,FFFFFFFF,00000000,00000000,FFFFFFFF
0XFFFFFFFF,00000000,00000000,FFFFFFFF,00000000,FFFFFFFF,FFFFFFFF,00000000
0XFFFFFFFF,00000000,00000000,FFFFFFFF,00000000,FFFFFFFF,FFFFFFFF,00000000
0X00000000,FFFFFFFF,FFFFFFFF,00000000,FFFFFFFF,00000000,00000000,FFFFFFFF
```
TEST PATTERN 528
FIG. 5B
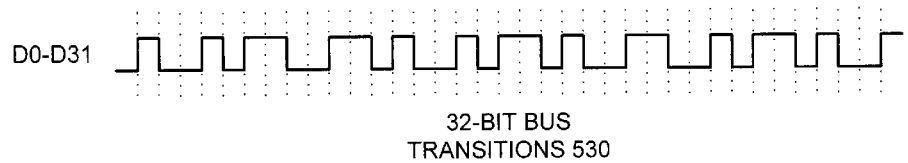
32-BIT BUS
TRANSITIONS 530
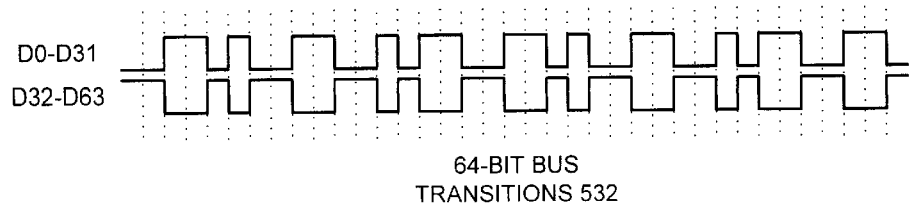
64-BIT BUS
TRANSITIONS 532
FIG. 5C

METHOD AND APPARATUS FOR GENERATING A DATA PATTERN FOR SIMULTANEOUSLY TESTING MULTIPLE BUS WIDTHS

BACKGROUND

1. Field of the Invention

The present invention relates to testing buses for computer systems. More specifically, the present invention relates to a method and an apparatus that facilitates generating a data pattern for simultaneously testing multiple bus widths.

2. Related Art

Modern computing systems often include multiple buses having different bus widths to couple together the various components of the system. These buses can include internal buses within a computer system component and external buses that couple the various computer system components together. Testing multiple buses that have different bus widths presents a number of problems to a test engineer.

One objective of testing a bus is to generate a maximum number of signal transitions on the bus. Generating a maximum number of signal level transitions on a bus can cause the bus to generate the maximum amount of electrical noise. Additionally, generating the maximum number of signal level transitions allows a tester to determine that the bus is free of signal crosstalk which may cause signal level margin and signal timing margins to be out of specification.

One method of selecting a data pattern that can cause all of the signal lines on a bus to switch simultaneously is to switch between all zeros and all ones. For example, a 32-bit data bus can be driven with alternating patterns of 0x00000000 and 0xFFFFFFFF to induce maximum stress on the bus. This method is effective when only 32-bit data buses are involved in testing. However, this method is not effective when more than one data bus width is being tested simultaneously.

FIG. 1 illustrates the process of testing a 1-bit data bus coupled to a 64-bit data bus using parallel to serial converter 106. As shown in FIG. 1, the system under test includes 64-bit CPU 102 and parallel to serial converter 106 coupled together by 64-bit bus 104. The output of parallel to serial converter 106 is 1-bit bus 108.

During the testing process, test pattern 114 is applied to the system to test the buses. In particular, test pattern 114 is selected to test 1-bit bus 108 and, in fact, provides the maximum transitions on 1-bit bus 108 as shown in 1-bit bus transitions 112. This pattern, however, does not provide any transitions on the 64-bit bus. Each line of 64-bit bus 104 is held at either a high level or a low level, but none of the lines of 64-bit bus 104 have any transitions as shown in 64-bit bus transitions 110.

FIG. 2 illustrates the process of testing a 4-bit data bus coupled to a 64-bit data bus using wide bus to narrow bus converter 206. As shown in FIG. 2, the system under test includes 64-bit CPU 202 and wide bus to narrow bus converter 206 coupled together by 64-bit bus 204. The output of wide bus to narrow bus converter 206 is 4-bit bus 208.

During the testing process, test pattern 214 is applied to the system to test the buses. In particular, test pattern 214 is selected to test 4-bit bus 208 and, in fact, provides the maximum transitions on 4-bit bus 208 as shown in 4-bit bus transitions 212. This pattern, however, does not provide any transitions on 64-bit bus 204. Each line of 64-bit bus 204 is held at either a high level or a low level, but none of the lines of 64-bit bus 204 have any transitions as shown in 64-bit bus transitions 210.

FIG. 3 illustrates the process of testing a 64-bit data bus coupled to a 4-bit data bus using wide bus to narrow bus converter 306. As shown in FIG. 3, the system under test includes 64-bit CPU 302 and wide bus to narrow bus converter 306 coupled together by 64-bit bus 304. The output of wide bus to narrow bus converter 306 is 4-bit bus 308.

During the testing process, test pattern 314 is applied to the system to test the buses. In particular, test pattern 314 is selected to test 64-bit bus 304 and, in fact, provides the maximum transitions on 64-bit bus 304 as shown in 64-bit bus transitions 310. This pattern, however, provides only one transition on 4-bit bus 308 for every sixteen bit-times as shown in 4-bit bus transitions 312.

FIGS. 2 and 3, taken together illustrate the problem encountered when testing buses with different widths. This testing provides maximum transitions to one bus while the other buses have no transitions or a minimal number of transitions. Thus, only one bus is adequately tested by each test pattern and the tester needs to develop several tests, one for each bus width, to adequately test the system.

What is needed is a method and an apparatus that facilitates generating a bus testing data pattern that does not exhibit the problems described above.

SUMMARY

One embodiment of the present invention provides a system that facilitates generating a bus testing data pattern for simultaneously testing multiple bus widths. The system first receives a list of bus widths to be tested. Next, the system receives a root test pattern with a width equal to the width of the smallest bus in the list. The system then extends this test pattern by inverting each bit of the root test pattern and concatenating this inverted pattern with the root test pattern. Next, the system creates an additional test pattern by repeating the second test pattern a sufficient number of times so that the width of this additional test pattern equals the width of the next larger bus. The system then creates a test pattern for the next larger bus by inverting each bit of the additional test pattern and concatenating this inverted test pattern with the additional test pattern. The test pattern can be used to simultaneously test the smallest bus width and the next larger bus width in the list of bus widths.

In one embodiment of the present invention, while larger bus widths remain in the list of bus widths the system repeats the steps of creating an additional test pattern by repeating the immediately previous test pattern sufficient times so that this additional test pattern width equals the width of the next larger bus in the list and then creating a second additional test pattern by inverting each bit of the first additional test pattern which is then concatenated with the first additional test pattern.

In one embodiment of the present invention, the system transmits a final test pattern created by this process through a set of buses related to the list of bus widths.

In one embodiment of the present invention, the system uses a final test pattern created by this process to test a set of buses related to the list of bus widths.

In one embodiment of the present invention, the final test pattern created by this process provides maximum transitional stress to each data bus.

In one embodiment of the present invention, if the list of bus widths is not available the system creates a default list of bus widths and uses the default list of bus widths as the list of bus widths to be tested.

In one embodiment of the present invention creating the default list of bus widths involves using one bit as a default smallest bus width and then assigning additional bus widths as increasing powers-of-two until a specified largest bus width is reached.

BRIEF DESCRIPTION OF THE FIGURES

FIG. 5A illustrates a typical computer system including various bus widths in accordance with an embodiment of the present invention.

FIG. 5B illustrates bus test pattern 528 in accordance with an embodiment of the present invention.

FIG. 5C illustrates bus transitions on 32-bit and 64-bit buses in accordance with an embodiment of the present invention.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Testing Two Bus Widths Simultaneously

Figure 1:
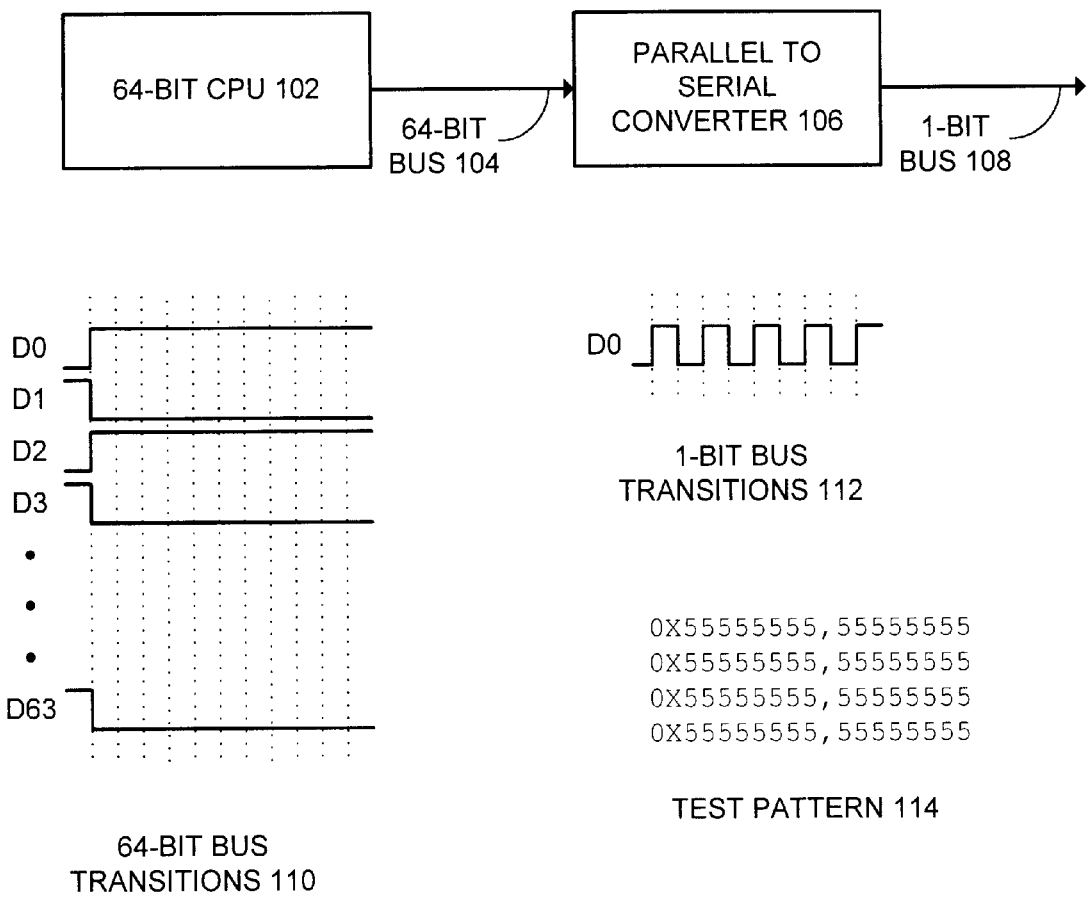
FIG. 1 illustrates testing a 1-bit data bus coupled to a 64-bit data bus using parallel to serial converter 106.
Figure 2:
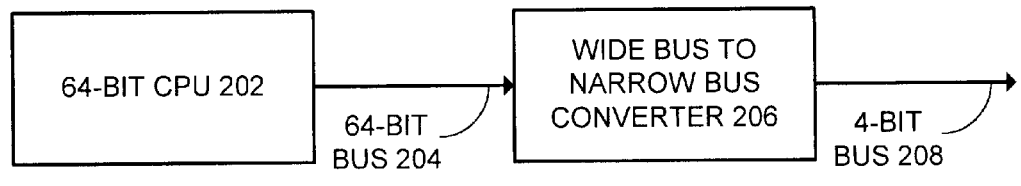
FIG. 2 illustrates testing a 4-bit data bus coupled to a 64-bit data bus using wide bus to narrow bus converter 206.
Figure 2:
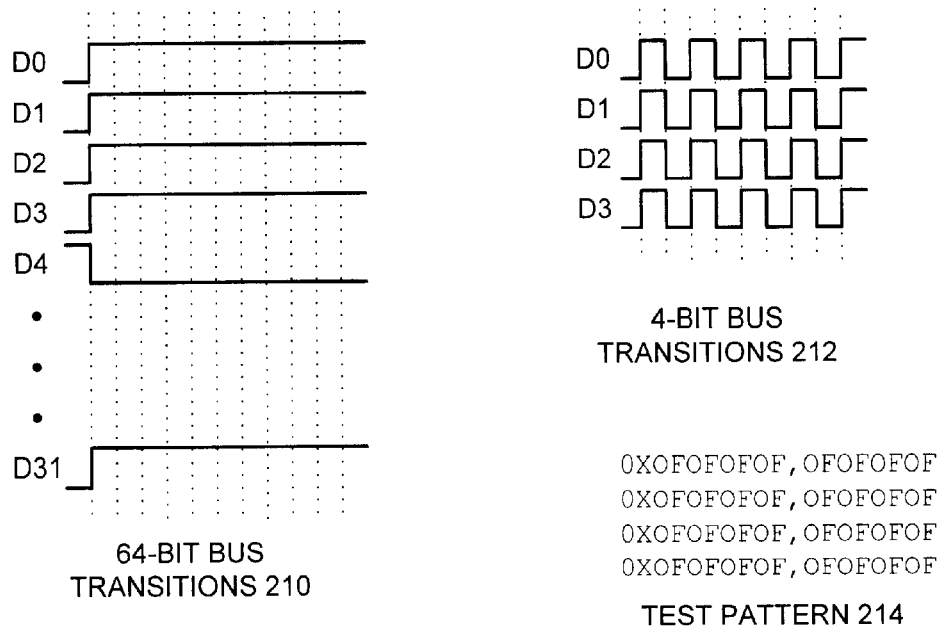
Figure 3:
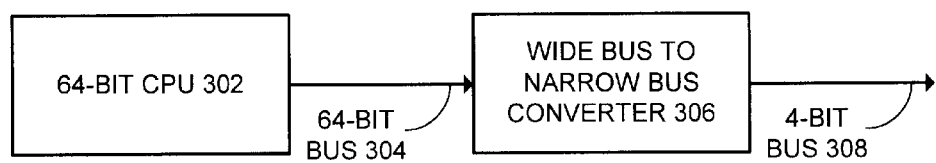
FIG. 3 illustrates testing a 64-bit data bus coupled to a 4-bit data bus using wide bus to narrow bus converter 306.
Figure 3:
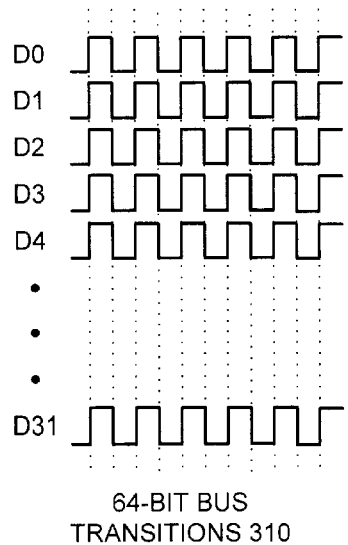
Figure 3:
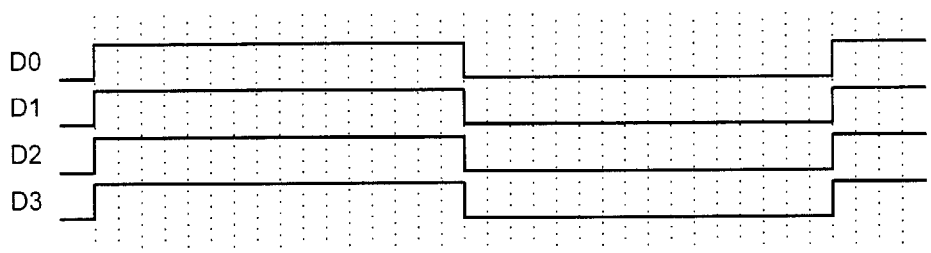
Figure 4:
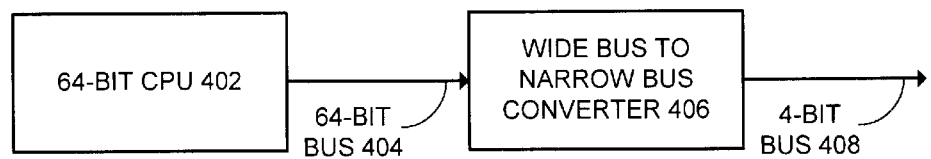
FIG. 4 illustrates testing a 64-bit data bus and a 4-bit data bus coupled together with wide bus to narrow bus converter 406 in accordance with an embodiment of the present invention.
Figure 4:
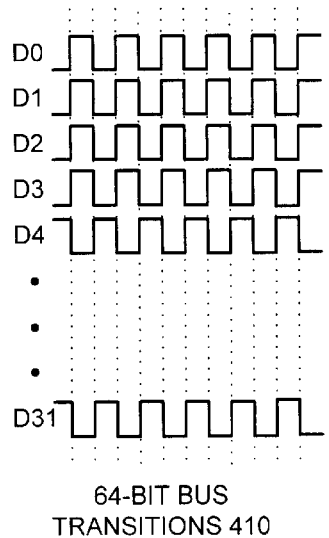
Figure 4:
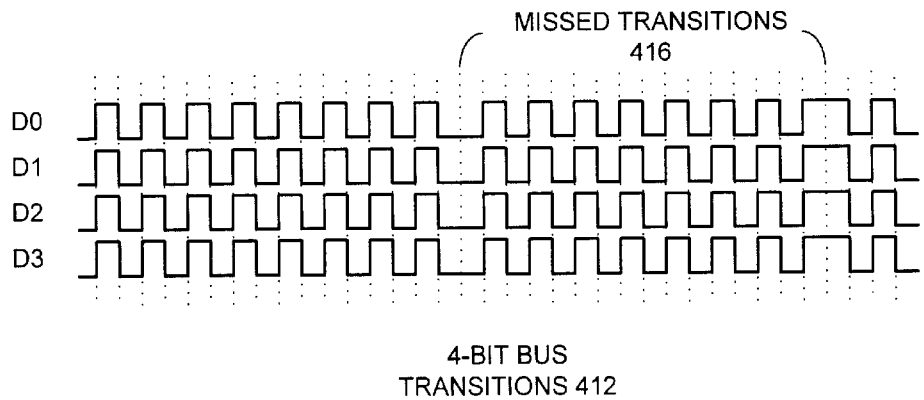

FIG. 4 illustrates testing a 64-bit data bus and a 4-bit data bus coupled together with wide bus to narrow bus converter 406 in accordance with an embodiment of the present invention. As shown in FIG. 4, the system under test includes 64-bit CPU 402 and wide bus to narrow bus converter 406 coupled together by 64-bit bus 404. The output of wide bus to narrow bus converter 406 is 4-bit bus 408.

Test pattern 414 is applied to the system to test the buses. In particular, test pattern 414 is selected to test both 4-bit bus 408 and 64-bit bus 404 simultaneously. Test pattern 414 provides the maximum transitions on 64-bit bus 404 as shown in 64-bit bus transitions 410. As shown in 64-bit bus transitions 410, this pattern provides transitions on 64-bit bus 404, which may start with a positive edge as shown for bits D0 through D3 or a negative edge as shown for bits D4 and D31. Note that the first transition for each bit depends upon the root test pattern selected as described below in conjunction with FIG. 6. Each line of 64-bit bus 404 has a transition at each bit-time.

Test pattern 414 also causes transitions on 4-bit bus 408 as shown in 4-bit bus transitions 412. Test pattern 414 causes transitions at each bit time with the exception of missed transitions 416. Note that there are transitions on each line of 4-bit bus 408 at fifteen of every sixteen bit times. Thus, test pattern 414 provides a high stress to both 64-bit bus 404 and 4-bit bus 408.

Testing a System with Multiple Bus Widths

FIG. 5A illustrates a typical computer system including various bus widths in accordance with an embodiment of the present invention. This system includes 64-bit CPU 502, data switches 506 and 518, memory 510, L2 cache 514, and peripheral bridge 522. 64-bit CPU 502 is coupled to data switch 506 with 128-bit bus 504 and to L2 cache 514 with 256-bit bus 512. Data switch 506 is coupled to memory 510 with 512-bit bus 508 and to data switch 518 with 256-bit bus 516. Data switch 518 is coupled to peripheral bridge 522 with 64-bit bus 520. The outputs of peripheral bridge 522 are 32/64-bit peripheral bus 524 and 64-bit graphics bus 526. Note that 32/64-bit peripheral bus can be either a 32-bit bus or a 64-bit bus depending on the peripheral that is in communication with the system. This system includes bus widths of 32, 64, 128, 256, and 512 bits.

FIG. 5B illustrates bus test pattern 528 in accordance with an embodiment of the present invention. Test pattern 528 was chosen as described below in conjunction with FIG. 6 to simultaneously test the five bus widths included in this system. Note that other patterns can be chosen to simultaneously test these buses as described below also in conjunction with FIG. 6.

FIG. 5C illustrates bus transitions on 32-bit and 64-bit buses in accordance with an embodiment of the present invention. As shown in 32-bit bus transitions 530, there is a transition on every data line of 32/64-bit bus 524 at 22 of every 32 bit-times or over 68 percent of the time. Additionally, 64-bit bus transitions 532 shows that there is a transition on every data line of 64-bit bus 520 and 64-bit graphics bus 526 at 20 out of every 32 bit-times or over 62 percent of the time.

Figure 5D:
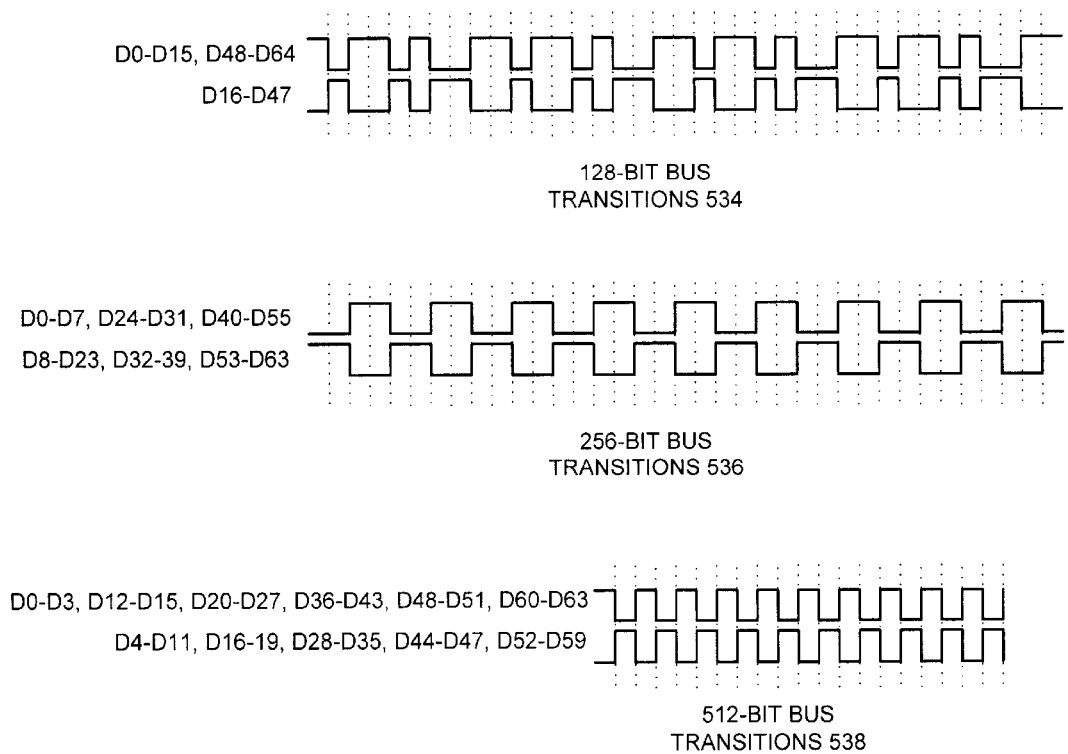
FIG. 5D illustrates bus transitions on 128-bit, 256-bit, and 512-bit buses in accordance with an embodiment of the present invention.

FIG. 5D illustrates bus transitions on 128-bit, 256-bit, and 512-bit buses in accordance with an embodiment of the present invention. The bus transitions for 128-bit bus 504 are shown in 128-bit bus transitions 534. As shown, there is a transition on every data line of the bus at 24 of every 32-bit-times or 75 percent of the time. 256-bit buses 512 and 516 have a transition on every data line at every other bit-time as shown in 256-bit bus transitions 536. Thus 256-bit buses 512 and 516 have a transition at 50 percent of the bit-times. 512 bit bus 508 has a transition at every bit time as shown in 512-bit bus transitions 538.

Test pattern 528, therefore, exercises each of the system buses of FIG. 5A with sufficient transitions so that a single test with test pattern 528 stresses each bus and provides a valid test for each bus. Note that other test patterns derived in the manner described below in conjunction with FIG. 6 can also be used.

Deriving a Test Pattern

Figure 6:
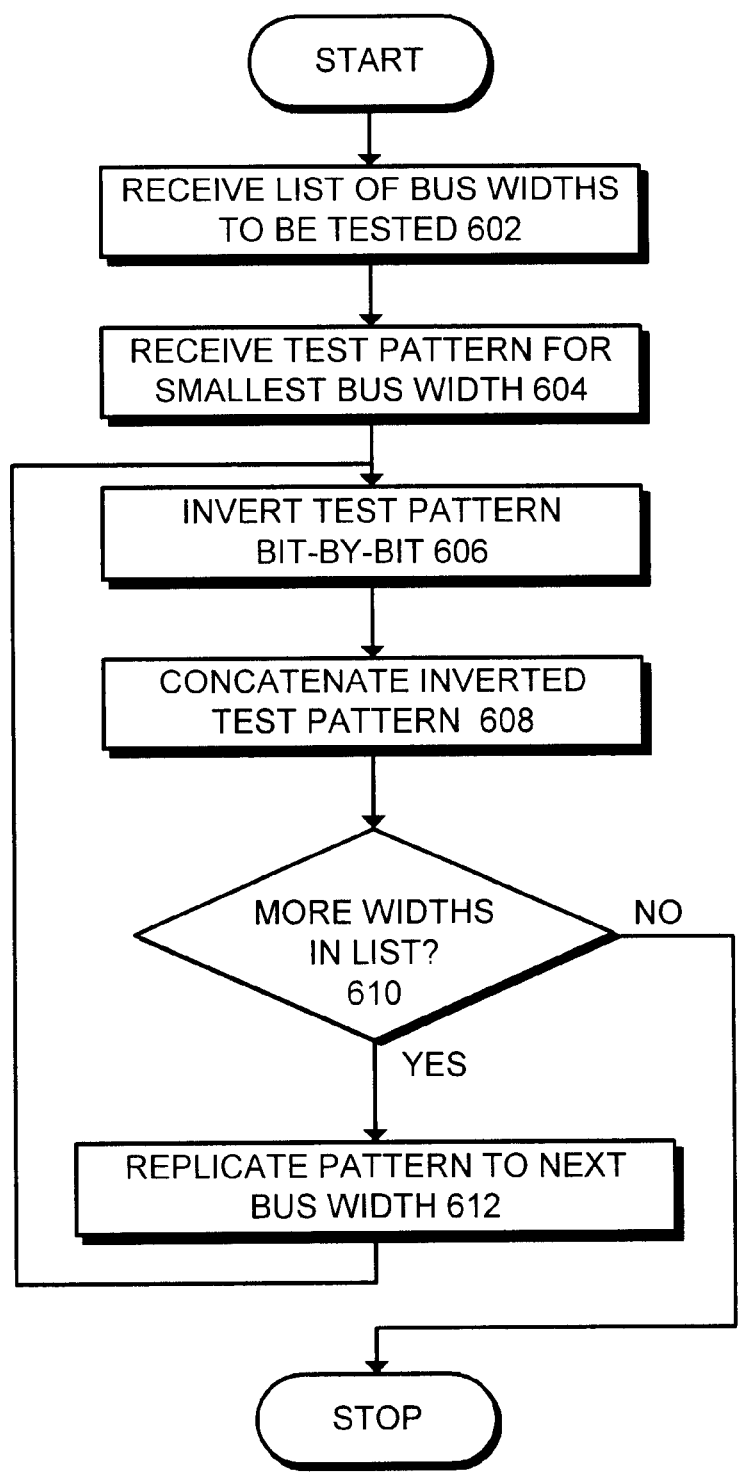
FIG. 6 is a flowchart illustrating the process of generating a test pattern for simultaneously testing multiple bus widths in accordance with an embodiment of the present invention.

FIG. 6 is a flowchart illustrating the process of generating a test pattern for simultaneously testing multiple bus widths in accordance with an embodiment of the present invention. The system starts by receiving a list of bus widths to be tested (step 602). In the system shown in FIG. 5A, this list includes widths of 32, 64, 128, 256, and 512 bits. Next, the system receives a root bit pattern for the smallest bus (step 604). Note that the system can receive the root bit pattern from a user or, alternatively, the root pattern can be generated by the system. Note also that this root pattern can include any bit pattern of the proper length. As an example, the bit pattern of 0x00000000 was selected to derive test pattern 528.

The system then inverts each bit of the root bit pattern to arrive at the bit pattern of 0xFFFFFFFF (step 606). This inverted bit pattern is concatenated with the root bit pattern to arrive at 0x00000000,FFFFFFFF (step 608). Next, the system determines if there are more widths in the list (step 610). In the example system, the answer is yes with a next larger bus width of 64 bits. If necessary, the pattern is replicated so that the pattern is the width of the next bus (step 612). In this example, the pattern is already 64-bits so replication is not needed. If the next size had been 128-bits rather than 64-bits, the pattern would be extended to 0x00000000,FFFFFFFF,00000000,FFFFFFFF.

Since the next bus width is 64 bits, the process returns to step 606 where the test pattern is inverted bit-by-bit to arrive at 0xFFFFFFFF,00000000. This pattern is concatenated to the original pattern to arrive at the next test pattern of 0x00000000,FFFFFFFF,FFFFFFFF,00000000. This process continues as described until the pattern has been extended to cover the largest bus width in the list of bus widths. Note that the final pattern will be twice as wide as the largest bus width to be tested. In the example, the final test pattern is 1024 bits and is shown as test pattern 528.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method that facilitates generating a bus testing data pattern for simultaneously testing multiple bus widths, the method comprising:
   receiving a list of bus widths to be tested;
   receiving a root test pattern, wherein a width of the root test pattern equals a smallest bus width in the list of bus widths;
   creating a second test pattern by inverting each bit of the root test pattern and concatenating this inverted root pattern with the root test pattern;
   creating a third test pattern by replicating the second test pattern zero or more times until the third test pattern width equals a next larger bus width in the list of bus widths; and
   creating a fourth test pattern by inverting each bit of the third test pattern and concatenating this inverted third test pattern with the third test pattern;
   whereby the fourth test pattern can be used to simultaneously test the smallest bus width and the next larger bus width in the list of bus widths.

2. The method of claim 1, further comprising:
   while a larger bus width remains in the list of bus widths, repeating the steps of:
      creating a first additional test pattern by repeating an immediately previous test pattern zero or more times so that a first additional test pattern width equals the next larger bus width in the list of bus widths; and
      creating a second additional test pattern by inverting each bit of the first additional test pattern and concatenating this inverted first additional test pattern with the first additional test pattern.

3. The method of claim 2, further comprising transmitting a final test pattern created by this process through a set of buses related to the list of bus widths.

4. The method of claim 2, further comprising using a final test pattern created by this process to test a set of buses related to the list of bus widths.

5. The method of claim 2, wherein a final test pattern created by this process provides maximum transitional stress to each data bus.

6. The method of claim 2, wherein if the list of bus widths is not available the method further comprises:
   creating a default list of bus widths; and
   using the default list of bus widths as the list of bus widths to be tested.

7. The method of claim 6, wherein creating the default list of bus widths involves:
   assuming one bit as the smallest bus width; and
   assigning additional bus widths as increasing powers-of-two until a specified largest bus width is reached.

8. A computer-readable storage medium storing instructions that when executed by a computer cause the computer to perform a method that facilitates generating a bus testing data pattern for simultaneously testing multiple bus widths, the method comprising:
   receiving a list of bus widths to be tested;
   receiving a root test pattern, wherein a width of the root test pattern equals a smallest bus width in the list of bus widths;
   creating a second test pattern by inverting each bit of the root test pattern and concatenating this inverted root pattern with the root test pattern;
   creating a third test pattern by replicating the second test pattern zero or more times until the third test pattern width equals a next larger bus width in the list of bus widths; and
   creating a fourth test pattern by inverting each bit of the third test pattern and concatenating this inverted third test pattern with the third test pattern;
   whereby the fourth test pattern can be used to simultaneously test the smallest bus width and the next larger bus width in the list of bus widths.

9. The computer-readable storage medium of claim 8, the method further comprising:
   while a larger bus width remains in the list of bus widths, repeating the steps of:
      creating a first additional test pattern by repeating an immediately previous test pattern zero or more times so that a first additional test pattern width equals the next larger bus width in the list of bus widths; and
      creating a second additional test pattern by inverting each bit of the first additional test pattern and concatenating this inverted first additional test pattern with the first additional test pattern.

10. The computer-readable storage medium of claim 9, the method further comprising transmitting a final test pattern created by this process through a set of buses related to the list of bus widths.

11. The computer-readable storage medium of claim 9, the method further comprising using a final test pattern created by this process to test a set of buses related to the list of bus widths.

12. The computer-readable storage medium of claim 9, wherein a final test pattern created by this process provides maximum transitional stress to each data bus.

13. The computer-readable storage medium of claim 9, wherein if the list of bus widths is not available the method further comprises:

creating a default list of bus widths; and using the default list of bus widths as the list of bus widths to be tested.

14. The computer-readable storage medium of claim 13, wherein creating the default list of bus widths involves:

assuming one bit as the smallest bus width; and assigning additional bus widths as increasing powers-of-two until a specified largest bus width is reached.

15. An apparatus that facilitates generating a bus testing data pattern for simultaneously testing multiple bus widths, the apparatus comprising:

a receiving mechanism that is configured to receive a list of bus widths to be tested;

wherein the receiving mechanism is further configured to receive a root test pattern, and wherein a width of the root test pattern equals a smallest bus width in the list of bus widths;

a pattern creating mechanism that is configured to create a second test pattern by inverting each bit of the root test pattern and concatenating this inverted root pattern with the root test pattern;

wherein the pattern creating mechanism is further configured to create a third test pattern by replicating the second test pattern zero or more times until the third test pattern width equals a next larger bus width in the list of bus widths; and wherein the pattern creating mechanism is further configured to create a fourth test pattern by inverting each bit of the third test pattern and concatenating this inverted third test pattern with the third test pattern;

whereby the fourth test pattern can be used to simultaneously test the smallest bus width and the next larger bus width in the list of bus widths.

16. The apparatus of claim 15:

wherein the pattern creating mechanism is further configured to create a first additional test pattern by repeating an immediately previous test pattern zero or more times so that a first additional test pattern width equals the next larger bus width in the list of bus widths; and wherein the pattern creating mechanism is further configured to create a second additional test pattern by inverting each bit of the first additional test pattern and concatenating this inverted first additional test pattern with the first additional test pattern.

17. The apparatus of claim 16, further comprising a transmitting mechanism that is configured to transmit a final test pattern created by this process through a set of buses related to the list of bus widths.

18. The apparatus of claim 16, further comprising a testing mechanism that is configured to use a final test pattern created by this process to test a set of buses related to the list of bus widths.

19. The apparatus of claim 16, wherein a final test pattern created by this process provides maximum transitional stress to each data bus.

20. The apparatus of claim 16, further comprising:

a default creating mechanism that is configured to create a default list of bus widths; and a testing mechanism that is configured to use the default list of bus widths as the list of bus widths to be tested.

21. The apparatus of claim 20, wherein the default creating mechanism further comprises:

a selecting mechanism that is configured to assume one bit as the smallest bus width; and wherein the selecting mechanism is further configured to assign additional bus widths as increasing powers-of-two until a specified largest bus width is reached.

* * * * *